US010019278B2

(12) United States Patent
Hasan et al.

(10) Patent No.: US 10,019,278 B2
(45) Date of Patent: Jul. 10, 2018

(54) FRAMEWORK FOR NETWORK TECHNOLOGY AGNOSTIC MULTI-CLOUD ELASTIC EXTENSION AND ISOLATION

(71) Applicant: Cisco Technology, Inc., San Jose, CA (US)

(72) Inventors: Masum Z. Hasan, San Jose, CA (US); Lewis Wiley Tucker, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 14/738,794

(22) Filed: Jun. 12, 2015

(65) Prior Publication Data
US 2015/0372943 A1 Dec. 24, 2015

Related U.S. Application Data

(63) Continuation-in-part of application No. 14/538,765, filed on Nov. 11, 2014.
(Continued)

(51) Int. Cl.
*G06F 15/177* (2006.01)
*G06F 9/455* (2018.01)
(Continued)

(52) U.S. Cl.
CPC ............ *G06F 9/45558* (2013.01); *G06F 9/50* (2013.01); *H04L 45/586* (2013.01); *G06F 2009/45587* (2013.01); *G06F 2009/45595* (2013.01)

(58) Field of Classification Search
CPC .................. G06F 9/45558; G06F 9/50; G06F 2009/45587; G06F 2009/45595; H04L 45/586
(Continued)

(56) References Cited

U.S. PATENT DOCUMENTS 7,139,819 B1 11/2006 Luo et al.
8,364,819 B2 * 1/2013 Ferris .................... G06F 9/5072
709/203
(Continued)

FOREIGN PATENT DOCUMENTS

WO 2015199795 A1 12/2015
WO 2015200012 A1 12/2015

OTHER PUBLICATIONS

Celesti, et al., "How to Enhance Cloud Architectures to Enable Cross-Federation", Cloud Computing (Cloud), 2010 IEEE 3rd International Conference on, IEEE, Piscataway, NJ USA,, Jul. 5, 2010, 337-345.
(Continued)

*Primary Examiner* — Joseph L Greene
(74) *Attorney, Agent, or Firm* — Johnson, Marcou & Isaacs, LLC

(57) ABSTRACT

Establishing an MCEE logical structure relating tenant resources of a tenant site, first non-tenant cloud resources at a first non-tenant cloud site, and second non-tenant cloud resources at a second non-tenant site. Mapping the MCEE logical structure nodes to a segmented end-to-end virtual network structure (E2E-VNS) such that the resources at each node of the MCEE logical structure is in a separate virtual network of the E2E-VNS. Establishing an extension and isolation (EXI) domain in the MCEE logical structure associating at least one node of the tenant resources with at least one node of the first non-tenant cloud and at least one node of the second non-tenant cloud. Connecting for network communications, the E2E-VNS virtual networks of the nodes of the EXI domain for isolation of the resources of the nodes of the EXI domain from the other resources of the MCEE logical structure in an EXI virtual network.

20 Claims, 9 Drawing Sheets

Related U.S. Application Data

(60) Provisional application No. 62/015,514, filed on Jun. 22, 2014, provisional application No. 62/015,516, filed on Jun. 22, 2014.

(51) Int. Cl.
    *H04L 12/713* (2013.01)
    *G06F 9/50* (2006.01)

(58) Field of Classification Search
    USPC .......................................................... 709/220
    See application file for complete search history.

(56) References Cited

U.S. PATENT DOCUMENTS

| | | |
|---|---|---|
| 2010/0027552 A1 | 2/2010 | Hill |
| 2010/0042720 A1 | 2/2010 | Stienhans et al. |
| 2010/0106812 A1 | 4/2010 | Bernabeu-Auban et al. |
| 2010/0318609 A1 | 12/2010 | Lahiri et al. |
| 2011/0075674 A1 | 3/2011 | Li et al. |
| 2011/0090911 A1 | 4/2011 | Hao et al. |
| 2011/0231899 A1 | 9/2011 | Pulier et al. |
| 2011/0261828 A1 | 10/2011 | Smith |
| 2012/0072985 A1 | 3/2012 | Davne et al. |
| 2012/0151057 A1 | 6/2012 | Paredes et al. |
| 2012/0233668 A1* | 9/2012 | Leafe ............... G06F 9/44526 726/4 |
| 2012/0281706 A1* | 11/2012 | Agarwal ............ H04L 67/1002 370/395.53 |
| 2012/0331528 A1 | 12/2012 | Fu et al. |
| 2013/0018994 A1* | 1/2013 | Flavel ................ H04L 41/0806 709/220 |
| 2013/0086234 A1 | 4/2013 | Salsburg et al. |
| 2013/0346619 A1 | 12/2013 | Panuganty et al. |
| 2014/0006580 A1 | 1/2014 | Raghu et al. |
| 2014/0006581 A1 | 1/2014 | Raghu et al. |
| 2014/0075565 A1 | 3/2014 | Srinivasan et al. |
| 2014/0164315 A1 | 6/2014 | Golshan et al. |
| 2015/0263885 A1 | 9/2015 | Kasturi et al. |
| 2015/0268935 A1 | 9/2015 | Muntes |
| 2015/0372857 A1 | 12/2015 | Hasan et al. |

OTHER PUBLICATIONS

Dewyn, "International Search Report and Written Opinion issued in International Application No. PCT/US2015/026418,", dated Jul. 23, 2015, 1-10.

Dewyn, "International Search Report and Written Opinion issued in International Application No. PCT/US2015/035702,", dated Jul. 24, 2015, 1-10.

Manno, et al., "FCFA: A Semantic-Based Federated Cloud Framework Architecture", 2012 International Conference on High Performance Computing & Simulation (HPCA 2012) IEEE Piscataway, NJ, USA 2012, pp. 42-52, XP002742324., Jul. 2, 2012, 42-52.

Greene, "Office Action issued in U.S. Appl. No. 14/538,765, filed Nov. 11, 2014", dated Oct. 17, 2016, 11 pages.

Greene, "Final Office Action issued in U.S. Appl. No. 14/538,765, filed Nov. 11, 2014", dated May 12, 2017, 11 pages.

Bai, "International Preliminary Report on Patentability issued in International Application No. PCT/US2015/035702,", dated Jan. 5, 2017.

Wittmann-Regis, "International Preliminary Report on Patentability issued in International Application No. PCT/US2015/026418,", dated Jan. 5, 2017, 7 pages.

Dewyn, et al., "Summons to attend oral proceedings pursuant to Rule 115(1) EPC", EP15720170.8 dated May 9, 2018, 7 pages.

Greene, "Final Office Action issued in U.S. Appl. No. 14/538,765 filed Nov. 11, 2014", dated Apr. 16, 2018, 17 pages.

\* cited by examiner

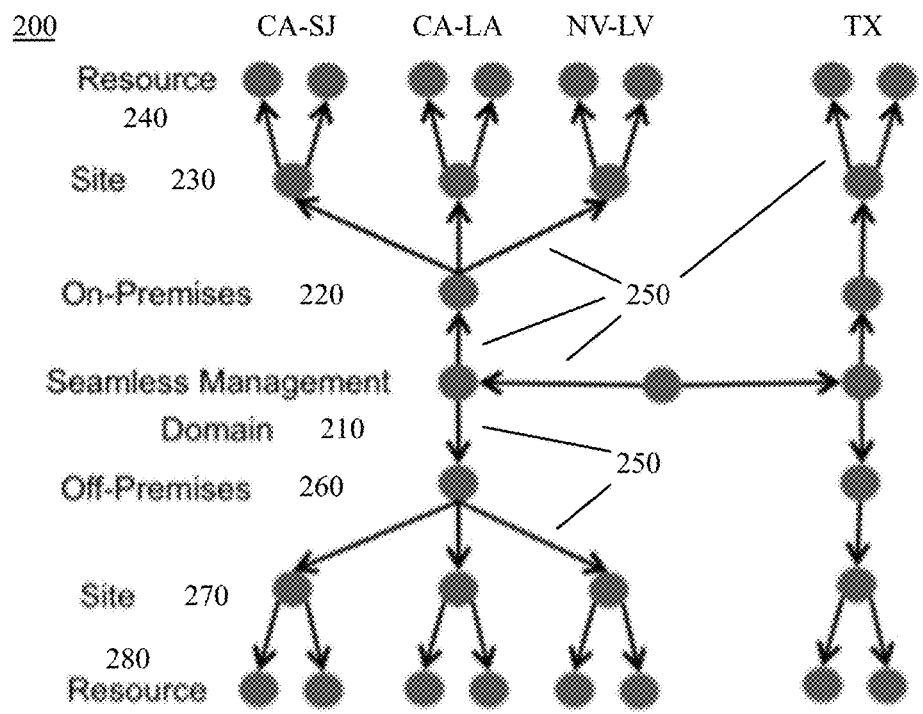
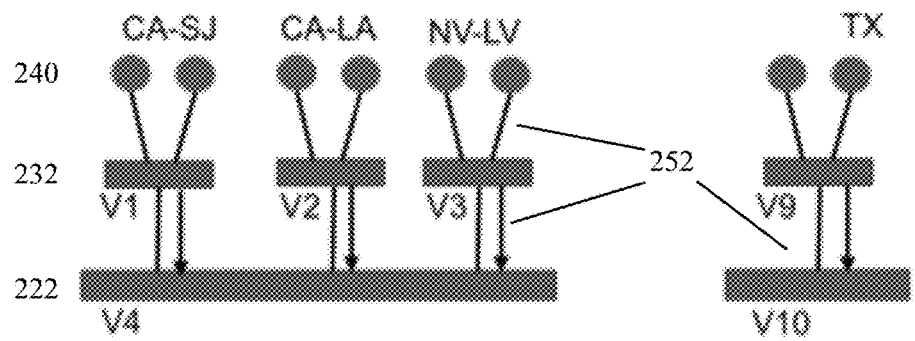
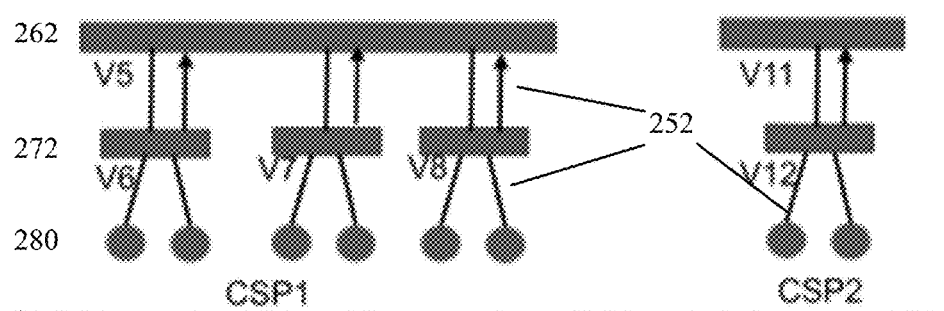
FIG. 2

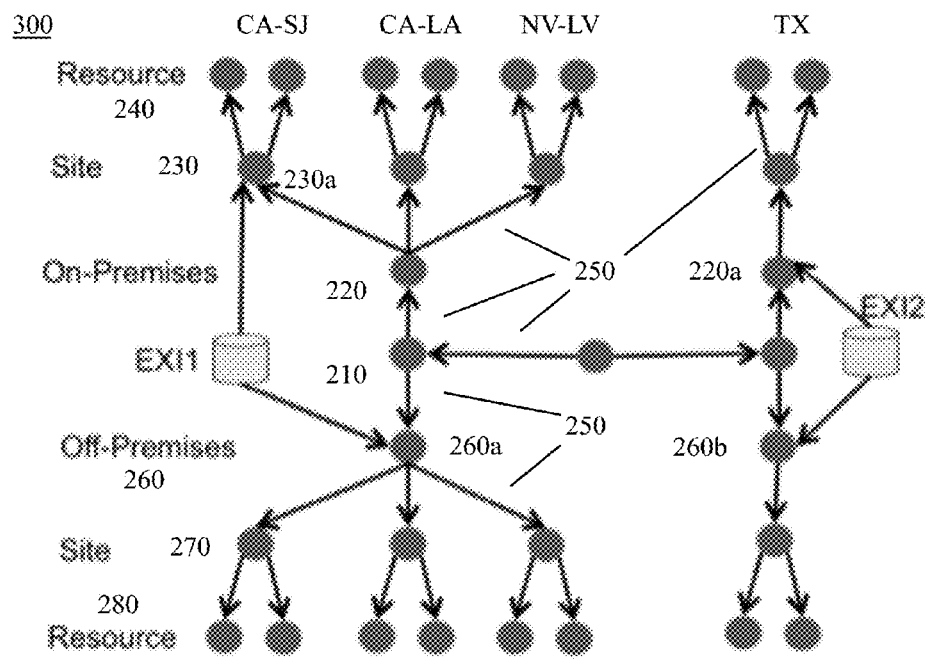
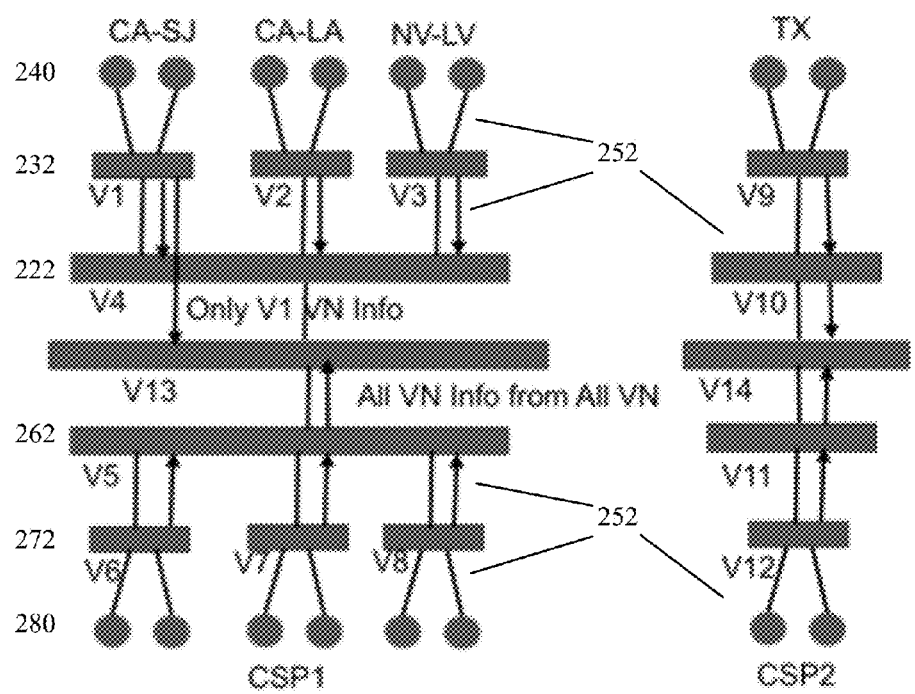
FIG. 3

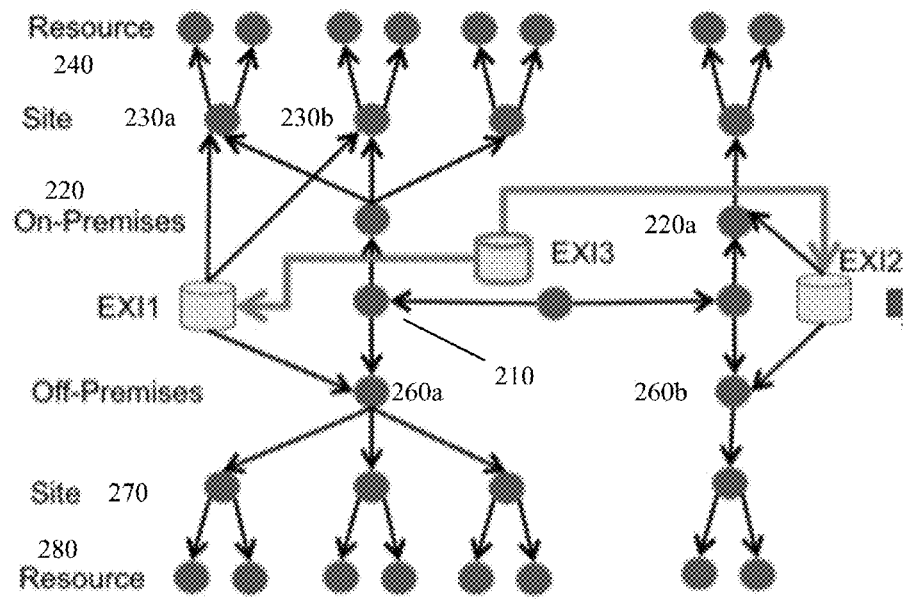
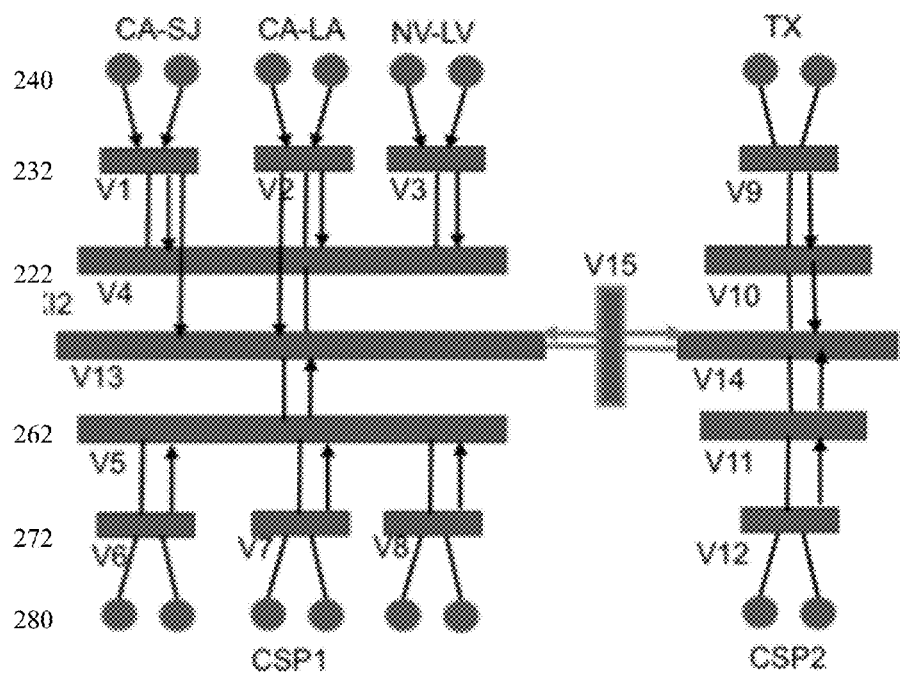
FIG. 5

600

```
┌─────────────────────────────────────────────────────────────────────────┐
│ Establishing, in a set of multi-cloud elastic extension (MCEE) engines, │
│ an MCEE logical structure relating at least one tenant resource of at   │
│ least one tenant site, at least one resource of a first non-tenant      │
│ cloud at a first non-tenant cloud site, and at least one resource of a  │
│ second non-tenant cloud at a second non-tenant cloud site;              │
│                                  610                                    │
└─────────────────────────────────────────────────────────────────────────┘
                                    │
                                    ▼
┌─────────────────────────────────────────────────────────────────────────┐
│         Mapping, by the MCEE engines, nodes of the logical structure    │
│         to a segmented end-to-end virtual network structure (E2E-VNS)   │
│         such that the collection of resources at each node of the MCEE  │
│         logical structure is in a separate virtual network of the       │
│         E2E-VNS                                                         │
│                                  620                                    │
└─────────────────────────────────────────────────────────────────────────┘
                                    │
                                    ▼
┌─────────────────────────────────────────────────────────────────────────┐
│ Establishing, by the MCEE engines, an extension and isolation (EXI)     │
│ domain in the MCEE logical structure associating at least one node of   │
│ the tenant resources with at least one node of the first non-tenant     │
│ cloud and at least one node of the second non-tenant cloud              │
│                                  630                                    │
└─────────────────────────────────────────────────────────────────────────┘
                                    │
                                    ▼
┌─────────────────────────────────────────────────────────────────────────┐
│           Connecting, by the MCEE engines, for network communications,  │
│           the E2E-VNS virtual networks of the nodes of the EXI domain   │
│           for isolation of the resources of the nodes from the other    │
│           resources                                                     │
│                                  640                                    │
└─────────────────────────────────────────────────────────────────────────┘
```

FIG. 6

FRAMEWORK FOR NETWORK TECHNOLOGY AGNOSTIC MULTI-CLOUD ELASTIC EXTENSION AND ISOLATION

RELATED APPLICATIONS

This application claims priority to U.S. Provisional Patent Application No. 62/015,514, filed Jun. 22, 2014 and entitled "A Framework For Network Technology Agnostic Multi-Cloud Elastic Extension And Isolation"; and is a continuation-in-part of U.S. patent application Ser. No. 14/538,765, filed Nov. 11, 2014 and entitled "Cloud Framework For Multi-Cloud Extension," which claims the benefit of U.S. Provisional Patent Application No. 62/015,516, filed Jun. 22, 2014 and entitled "An Advanced Cloud Representation and Visual Framework for Multi-Cloud Elastic Extension." The complete disclosure of each above-identified application is hereby fully incorporated herein by reference.

TECHNICAL FIELD

The disclosed technology relates to cloud computing, and more particularly to frameworks for multi-cloud elastic extension.

BACKGROUND

"Cloud computing" can refer to a model for enabling ubiquitous, convenient, on-demand network access to a shared pool of configurable computing resources (for example, networks, servers, storage, applications, and services) that can be rapidly provisioned and released with minimal management effort or service provider interaction. This cloud model can be described as composed of five characteristics, three service models, and four deployment models.

The characteristics include the following.

On-demand self-service—A consumer can unilaterally provision computing capabilities, such as server time and network storage, as needed automatically without requiring human interaction with each service provider.

Broad network access—Capabilities are available over the network and accessed through standard mechanisms that promote use by heterogeneous thin or thick client platforms, for example, mobile phones, tablets, laptops, and workstations.

Resource pooling—The provider's computing resources are pooled to serve multiple consumers using a multi-tenant model, with different physical and virtual resources dynamically assigned and reassigned according to consumer demand. A sense of location independence exists in that the customer generally does not have any control or knowledge over the exact location of the provided resources but may be able to specify location at a higher level of abstraction (for example, country, state, or datacenter). Examples of resources include storage, processing, memory, and network bandwidth.

Rapid elasticity—Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service—Cloud systems automatically control and optimize resource use by leveraging a metering capability at some level of abstraction appropriate to the type of service (for example, storage, processing, bandwidth, and active user accounts). Typically, this process is done on a pay-per-use or charge-per-use basis. Resource usage can be monitored, controlled, and reported, providing transparency for both the provider and consumer of the utilized service.

Service models can include the following:

Software as a Service (SaaS). The consumer uses the provider's applications running on a cloud infrastructure. A cloud infrastructure is the collection of hardware and software that enables the five characteristics of cloud computing. The cloud infrastructure can be viewed as containing both a physical layer and an abstraction layer. The physical layer consists includes the hardware resources that are necessary to support the cloud services being provided, and typically includes server, storage, and network components. The abstraction layer includes the software deployed across the physical layer, which manifests the essential cloud characteristics. Conceptually the abstraction layer sits above the physical layer.

Platform as a Service (PaaS). Consumer-created or acquired applications created using programming languages, libraries, services, and tools are deployed onto the cloud infrastructure and supported by the provider. This capability does not necessarily preclude the use of compatible programming languages, libraries, services, and tools from other sources. The consumer does not manage or control the underlying cloud infrastructure, including network, servers, operating systems, or storage, but has control over the deployed applications and possibly configuration settings for the application-hosting environment.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (for example, host firewalls).

Deployment models include the following:

Private Cloud. The cloud infrastructure is provisioned for exclusive use by a single organization comprising multiple consumers (for example, business units). It may be owned, managed, and operated by the organization, a third party, or some combination of them, and it may exist on or off premises.

Community Cloud. The cloud infrastructure can be provisioned for use by a specific community of users from organizations that have shared concerns (for example, mission, security requirements, policy, and compliance considerations). It may be owned, managed, and operated by one or more of the organizations in the community, a third party, or some combination of them, and it may exist on or off premises.

Public Cloud. The cloud infrastructure can be provisioned for open use by the general public. It may be owned, managed, and operated by a business, academic, or government organization, or some combination of them. It exists on the premises of the cloud provider.

Hybrid Cloud. The cloud infrastructure is a composition of two or more distinct cloud infrastructures (private, community, or public) that remain unique entities, but are bound together by standardized or proprietary technology that enables data portability and application portability (for example, cloud bursting for load balancing between clouds).

BRIEF DESCRIPTION OF THE DRAWINGS

FIG. 2 illustrates a multi-cloud elastic extension (MCEE) structure, without an EXtension and Isolation (EXI) node, and a cloud logical structure mapped to virtual networks (VNs), in accordance with certain example embodiments.

FIG. 3 illustrates EXI specification and propagation across VNs with isolation of two segments, in accordance with certain example embodiments.

FIG. 5 illustrates an EXI across two cloud service provider (CSP) domains and propagation across VNs, in accordance with certain example embodiments.

FIG. 6 is a block flow diagram depicting processes for multi-cloud elastic extension and isolation, in accordance with certain example embodiments.

DETAILED DESCRIPTION OF EXAMPLE EMBODIMENTS

Overview

Embodiments of the technology disclosed herein include network technology agnostic distributed and elastic structures and relevant operations that allow implementation of multi-cloud elastic extension in the network end-to-end irrespective of the network technology used in the cloud infrastructure end-to-end.

Example System Architectures

In example architectures for the technology, while each cloud, server, system, and device shown in the architecture is represented by one instance of the cloud, server, system, or device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 1:
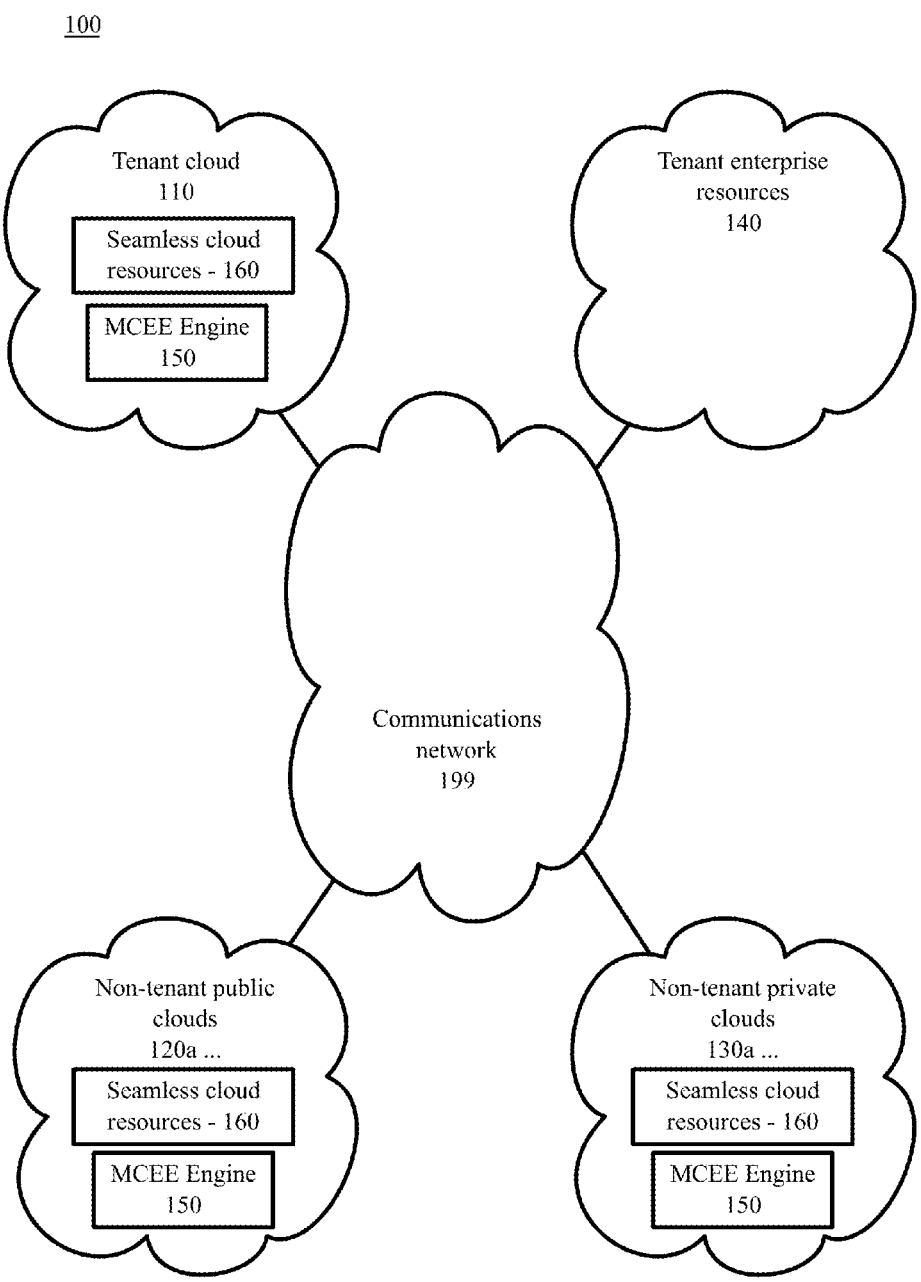
FIG. 1 is a block diagram depicting a communications and processing architecture in accordance with certain example embodiments.

As depicted in FIG. 1, architecture 100 includes computing networks 110, 120, 130, and 140, each network comprising one or more network computing devices, and some networks comprising a multi-cloud elastic extension (MCEE) engine 150 and seamless cloud resources 160. Each network 110-140, each MCEE engine 150, and each seamless cloud resource 160 can be configured to communicate with one another via communications network 199. In some embodiments, a user associated with a device on a network must install an application and/or make a feature selection to obtain the benefits of the technology described herein.

Network 199 includes one or more wired or wireless telecommunications means by which network devices may exchange data. For example, the network 199 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110-140, each MCEE engine 150, and each seamless cloud resource 160 can include a communication module capable of transmitting and receiving data over the network 199. For example, each network device 110-140, each MCEE engine 150, and each seamless cloud resource 160 can include a server, a desktop computer, a laptop computer, a tablet computer, a television with one or more processors embedded therein and/or coupled thereto, a smart phone, a handheld computer, a personal digital assistant (PDA), gateways, routers, network bridges, switches, hubs, and repeaters, or any other wired or wireless processor-driven device.

The network connections illustrated are examples, and other means of establishing a communications link between the computers and devices can be used. Additionally, those having ordinary skill in the art and having the benefit of this disclosure will appreciate that the network devices illustrated in FIG. 1 may have any of several other suitable computer system configurations. For example, a network device embodied as a mobile phone or handheld computer may not include all the components described above.

In some embodiments, network 110 can be a tenant cloud, each of networks 120 can be a non-tenant private cloud, each of networks 130 can be a non-tenant private cloud, and network 140 can include tenant enterprise resources. In such embodiments, each MCEE engine 150 can be operated by the operator of the associated network/resource, and each seamless cloud resource 160 is available for provisioning and allocation to a tenant resource demand.

Figure 9:
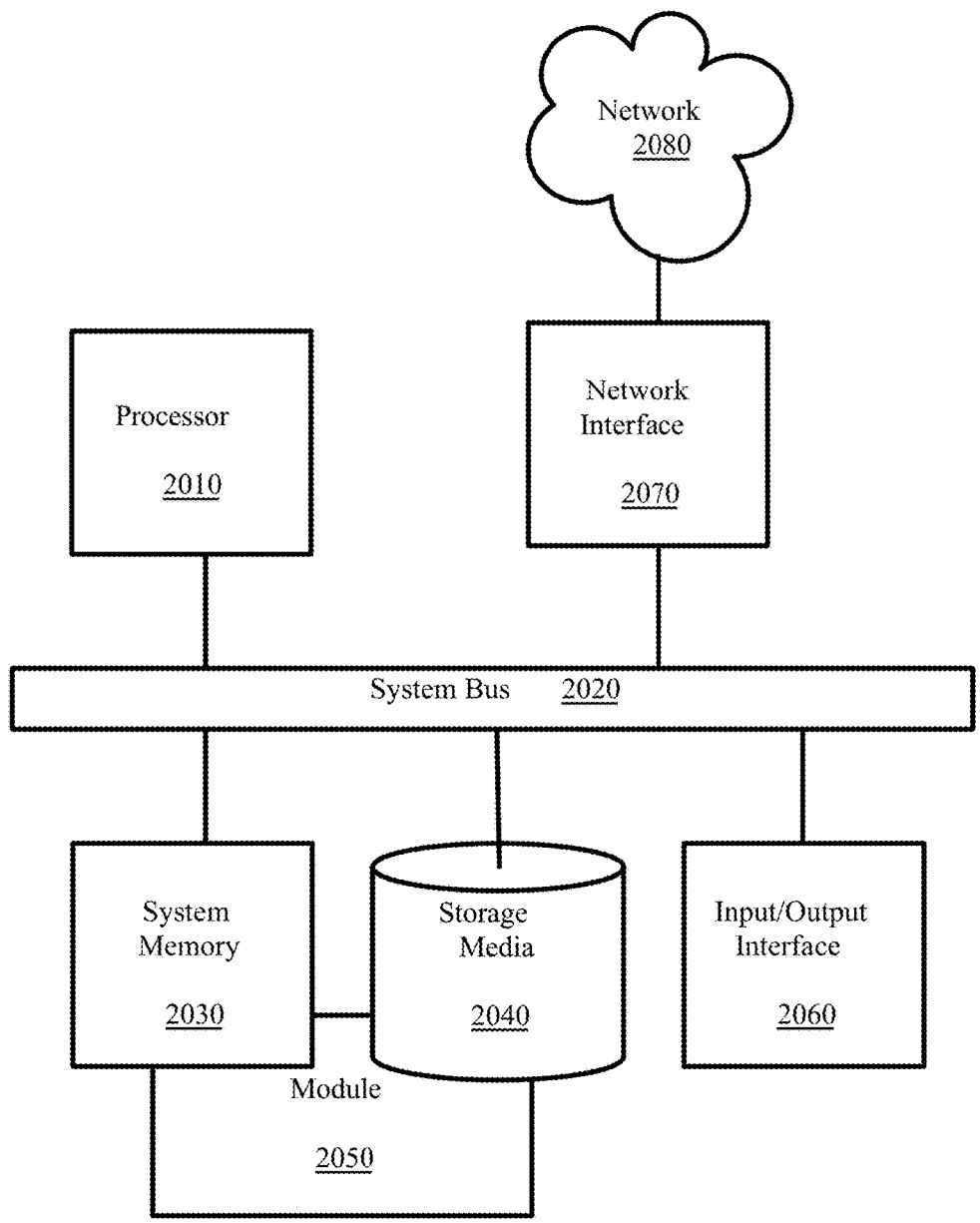
FIG. 9 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 9. Furthermore, any modules associated with any of these computing machines, such as modules described herein or any other modules (scripts, web content, software, firmware, or hardware) associated with the technology presented herein may by any of the modules discussed in more detail with respect to FIG. 9. The computing machines discussed herein may communicate with one another as well as other computer machines or communication systems over one or more networks, such as network 199. The network 199 may include any type of data or communications network, including any of the network technology discussed with respect to FIG. 9.

Example Embodiments

The example embodiments illustrated in the following figures are described hereinafter with respect to the components of the example operating environment and example architecture described elsewhere herein. The example embodiments may also be practiced with other systems and in other environments. For example, an MCEE engine 150 associated with tenant resources (such as tenant cloud 110 and tenant enterprise resources 140) can be deployed with an independent connection to communications network 199.

The future of cloud computing is evolving towards a multi-cloud environment, where a tenant may extend elastically any one or more of its own private cloud 110, select subset of private cloud sites, and select subset of resources in those selected sites (referred to herein generally as tenant cloud 110). Such seamless cloud resources 160 can be widely distributed across multiple clouds and constitute resources of a seamless cloud instance to be acquired by a tenant. A tenant's resources may include non-cloud tenant enterprise resources, for example, tenant enterprise resources 140. The MCEE framework binds these distributed resources securely and seamlessly. A tenant may extend its private cloud 110 to any one or more of one or more public clouds, a select subset of public cloud sites, and a select subset of resources in those sites (referred to herein generally as non-tenant cloud 120a ... 120n). This extension is analogous to a National Institute of Standards and Technology (NIST)-defined hybrid cloud in a multi-cloud context.

A tenant may extend its private cloud 110 to any one or more of other private clouds, a select subset of their sites, and a select subset of resources in those sites (referred to herein generally as non-tenant private clouds 130a ... 130n), possibly via one or more public clouds with a select subset of their sites and resources in those sites. This extension is analogous to a NIST-defined community cloud in multi-cloud context.

Note that, even if a tenant does not have its own private cloud, it may want to extend its enterprise (intranet) 140 into multiple clouds. Given a set of clouds, sites, and resources in those sites, a tenant may want to create multiple instances of such multi-cloud extensions. A tenant, or a system operator or other stakeholder, may further want to keep each instance isolated from other instances and merge or split instances on-demand based on conditions or requirements.

Realization (implementation in an infrastructure or network) of an MCEE in the infrastructure becomes a challenge for following reasons, among others: Complex underlying infrastructure may belong to multiple organizations. Complex network E2E may include many segments. Each segment may include multiple networking technologies, for example, Linux Bridge, Virtual Local Area Network (VLAN), Virtual eXtensible LAN (VXLAN), Virtual Routing and Forwarding (VRF)-Lite, VRF, Multi-Protocol Label Switching (MPLS) Virtual Private Network (VPN), Internet Protocol Security (IPSEC), Virtual Private LAN Service (VPLS), Overlay Transport Virtualization (OTV), etc.

Consider either one tenant private cloud 110 or tenant enterprise resource 140 extending into one public cloud 120a thus forming a 1:1 Hybrid Cloud. The same tenant may extend into another public cloud 120b, but does so separately. Embodiments of the technology disclosed herein focus on extending into multiple clouds and considering the extensions as one single seamless extension.

Disclosed herein are various embodiments of network technology agnostic distributed and elastic structures and relevant operations and methods that allow realization (implementation) of multi-cloud extension in the network end-to-end irrespective of the network technology used in the cloud infrastructure end-to-end. The structures are network technology agnostic because these structures do not depend on any particular network technology or special network isolation technologies, such as VLAN, VXLAN, Generic Routing Encapsulation (GRE), IPSEC, VPLS, MPLS Layer 3 (L3) VPN, etc. Example embodiments are illustrated using MPLS L3 VPN technology; however, the principles apply to each network isolation technology.

An MCEE by a tenant can be realized via two levels of distributed and elastic structures and relevant operations as follows.

Multi-Cloud Elastic Extension Structure (MCEES): A distributed and elastic structure including logical representation of on-premises and off-premises clouds, cloud sites, site resources, and representation for extension and isolation from a tenant's private cloud 110 or tenant enterprise 140 to two or more other clouds, such as non-tenant public clouds 120 and non-tenant private clouds 130. This structure represents the logical topology, where each node in the topology has certain semantics.

E2E Virtual Network Structure (E2E-VNS): The MCEES is mapped to a network technology agnostic end-to-end elastic and distributed virtual network structure. It has the following characteristics. This structure includes multiple virtual network units, which facilitate elasticity (on-demand or dynamic addition or deletion). The structure facilitates isolation of a multi-cloud extension both locally (in the cloud DC) and globally (in a MAN/WAN). It facilitates assigning a single network domain to a multi-cloud extension instance. For example, a single subnet can be assigned to an instance even though the instance spans multiple network segments, including multi-AS.

Elastic Mapping to Multi-AS MPLS L3 VPN Network— The E2E-VNS, being network technology agnostic, can be mapped to any available underlying network isolation technologies, such as VPLS, or L3 MPLS VPN, or site-to-site IPSEC, in combination with other isolation technologies, such as VLAN or VXLAN or GRE tunnel. Example embodiments of the technology disclosed herein provide an MPLS L3 VPN.

In a cloud environment, each level of the cloud infrastructure should be elastically programmable. However, it is challenging to program elastically (dynamically/on-demand) in an MPLS L3 VPN network (a widely deployed technology) that also includes Multi-AS or Multi-Service Provider (SP) MPLS L3 VPN network. Example embodiments of the technology disclosed herein provide an MPLS L3 VPN elastic programming approach that employs elastic MCEES and E2E-VNS structures and their methods as an illustration of the principles of embodiments used with respect to isolation technologies in general.

Embodiments of the technology disclosed herein (structures, operations and mapping described above) are distributed. An MCEE has multiple segments corresponding to multiple clouds and network segments. For example, the tenant (controlling tenant cloud 110 and tenant enterprise resources 140) and a first Cloud Service Provider (CSP1—controlling either a non-tenant public cloud 120a or a non-tenant private cloud 130a) have control over a segment of a network, and the tenant and a second CSP2 (controlling either a non-tenant public cloud 120b or a non-tenant private cloud 130b) together have control over a different segment of the network over which a single instance of tenant's MCEE spans. Accordingly, their operations and mappings can be distributed. The structure is defined in, and maintained by, a plurality of MCEE engines 150, at least one of which is associated with tenant resources (shown as part of tenant cloud 110 in FIG. 1, but just as readily deployed as part of tenant enterprise resources 140), and at least one of which is associated with each non-tenant cloud to be extended into (shown as part of each non-tenant cloud 120, 130 in FIG. 1, but just as readily deployed outside the non-tenant cloud). In example embodiments, there is one MCEE engine 150 per non-tenant cloud provider DC. The various MCEE engines 150 operate together in a distributed fashion to implement the present technology.

Multi-Cloud Elastic Extension Structure

The structures described below correspond to a tenant's MCEE. As the tenant elastically extends into/extracts from multiple clouds or their sites (or even individual resources), the structure is elastically grown or shrunk. A particular tenant may have multiple instances of such structure corresponding to multiple MCEEs. The logical structure and semantics of an MCEE network includes logical nodes and edges logically connecting the nodes.

Referring to FIG. 2, and continuing to refer to FIG. 1 for context, a multi-cloud elastic extension (MCE) structure, without an EXtension Isolation (EXI) node, and a cloud logical structure mapped to virtual networks (VNs) 200, in accordance with example embodiments, is shown. MCEE engines 150, distributed across the managed resources, can establish, operate, and maintain the MCEES and E2E-VNS.

In an MCEES cloud logical structure (CLS), the MCEE engines 150 (distributed across the tenant's resources and the DC sites of CSP1 and CSP2) can establish one or more seamless management domain nodes 210, a logical node for management of on-premises resources (ONP) 220 (for example, some or all of the resources of each of a tenant's private cloud 110 and a tenant's enterprise resources 140), one or more logical nodes for management of extension into each on-premises site (ONS) 230, and one or more logical nodes for management of extension into each resource of an on-premises site (ONR) 240. In a similar fashion, the MCEE engines 150 can establish edges 250, with each edge 250 representing a logical connection. For example, the MCEE engines 150 connect each ONP 220 logically to one or more ONS 230 using edges 250, and connect each ONS 230 logically to one or more ONR 240 using edges 250.

The MCEE engines 150 can establish a logical node for management of off-premises resources (OFP) 260 (for example, some or all of the resources of each of a non-tenant public cloud 120a and a non-tenant private cloud 130a), one or more logical nodes for management of extension into each off-premises site (OFS) 270, and one or more logical nodes for management of extension into each resource of an off-premises site (OFR) 280. In a similar fashion, the MCEE engines 150 can establish edges 250, with each edge 250 representing a logical connection. For example, the MCEE engines 150 connect each OFP 260 logically to one or more OFS 270 using edges 250, and connect each OFS 270 logically to one or more OFR 280 using edges 250.

If the tenant creating an MCEE instance desires a single network domain for the whole MCEE, the tenant uses the tenant's MCEE engine 150 to specify a domain addressing scheme, such as a private IP address prefix.

E2E Virtual Network Structure (E2E-VNS)

Continuing to refer to FIG. 2, while referring to FIG. 1 for context, the MCEE engines 150 can map the MCEES logical structure to network-agnostic virtual networks (VN) and a logical topology consisting of these VNs. The MCEE engines 150 can establish an on-premises site virtual network (ON-SVN) 232 (for example, each of V1-V3 and V9) corresponding to ONS 230. Each ON-SVN 232 can be characterized by a site identifier (SiteID), and an identifier for each resource 240 connected to the ON-SVN 232 (SiteID.ResourceSetID). If single domain addressing, such as a private IP address is desired, each ON-SVN 232 can be mapped to an address from the desired domain. This address can be translated, for example using Network Address Translation (NAT) at the VN. The MCEE engines 150 can establish an on-premises cloud virtual network (ON-CVN) 222 (for example, each of V4 and V10) corresponding to ONP 220. Each ON-CVN 222 can be assigned a cloud identifier (CloudID). The MCEE engines 150 can establish edges 252, with each edge 252 representing a logical connection between a pair of VNs. For example, the MCEE engines 150 connect each ON-CVN 222 logically to one or more ON-SVN 232 using edged 250. The MCEE engines 150 map each such connection based on the underlying network isolation technology used by the resources. A mapping using MPLS L3 VPN is provided as an example embodiment below.

The MCEE engines 150 establish an off-premises site virtual network (OF-SVN) 272 (for example V6-V8, V12) corresponding to OFS 270. Each OF-SVN 272 can be characterized by a site identifier (SiteID) and an identifier for each resource 280 connected to the OF-SVN 272 (SiteID.ResourceSetID). If single domain addressing, such as a private IP address is desired, each OF-SVN 272 is mapped to an address from the desired domain. This address will be translated, for example using Network Address Translation (NAT) at the VN. The MCEE engines 150 can establish an off-premises cloud virtual network (OF-CVN) 262 (for example V5, V11) corresponding to OFP 260. Each OF-CVN 262 can be assigned a cloud ID (CloudID). The MCEE engines 150 can establish edges 252, with each edge 252 representing a logical connection. For example, the MCEE engines 150 connect each OF-CVN 262 logically to one or more OF-SVN 272 using edges 252. The MCEE engines 150 map each such connection based on the underlying network isolation technology used by the resources.

Each virtual network (VN) defines a reachability and isolation domain. The MCEE engines 150 of the resources at each site (for example, at the tenant's site, and at CSP1's site) can map a set of resources to a virtual network based on specific network isolation technology (such as VLAN, VXLAN or MPLS L3 VPN), thus providing it semantics in the network. While there could be a single VN per an instance of MCEE, dividing into smaller units facilitates elasticity.

Each edge 250, 252 corresponds to reachability into other VN units in both directions. When two VNs, for example, V1 and V2, are "connected," the MCEE engines 150 exchange node related information between them. Thus, nodes attached to V1 become reachable to nodes attached to V2, and vice versa, when they are mapped to a specific networking technology. In example embodiments, the node information exchanged is CloudID, SiteID, SiteID.ResourceID, and single domain addresses. In MPLS L3 VPN mapping, extended community route target (ECRT) information is also exchanged between MCEE engines 150. Since the structure can be distributed, this information may be exchanged between MCEE engines 150 remotely or over network.

Multi-Cloud Extension Function

Referring to FIG. 3, and continuing to refer to prior figures for context, the MCEES of FIG. 2 with two extension and isolation (EXI) nodes (EXI1, EXI2), and the corresponding E2E-VNS 300 is shown, in accordance with certain example embodiments. In such embodiments, a tenant can extend its resources in the context of the MCEES and E2E-VNS of FIG. 2 to resources of Cloud Service Provider (CSP1) and to resources of CSP2 as follows:

Extension-1—The distributed MCEE engines 150 (one associated with the tenant's resources, and one associated with CSP1's first site), upon user input, can connect ONS 230a and ONS 230b to OFP 260a of CSP1 using EXI1, thus extending the tenant's on-premises CA-SJ resources into CSP1's off-premises public cloud.

Extension-2—The distributed MCEE engines 150 (the one associated with the tenant's resources, and one associated with CSP2's site), upon user input specifying the nodes to connect, can connect ONP 220a and OFP 260b using EXI2, thus extending the tenant's on-premises TX resources into CSP2's private cloud.

Multi-Cloud Extension Function Mapping to Virtual Network. For each new EXI, a virtual network is created. Each such VN logically spans multiple network domains. For example, on-premises and off-premises or multiple CSP network domains. The semantics are the same as described with regard to E2EVNS. In the case of FIG. 3, EXI-VNs V13 and V14 are created. V13 spans the domains of tenant's CA-SJ resources and all of CSP1's resources in the MCEE. Elastic Mapping to Multi-AS MPLS L3 VPN Network The following procedures, together with the distributed MCEES and E2E-VNS provide an elastic layer on top of a Multi-AS MPLS L3 VPN network. When the MPLS L3 VPN mapping function is turned on in the MCEE engines 150, the following operations are performed elastically as nodes and edges are added (deleted) dynamically on-demand.

Figure 4:
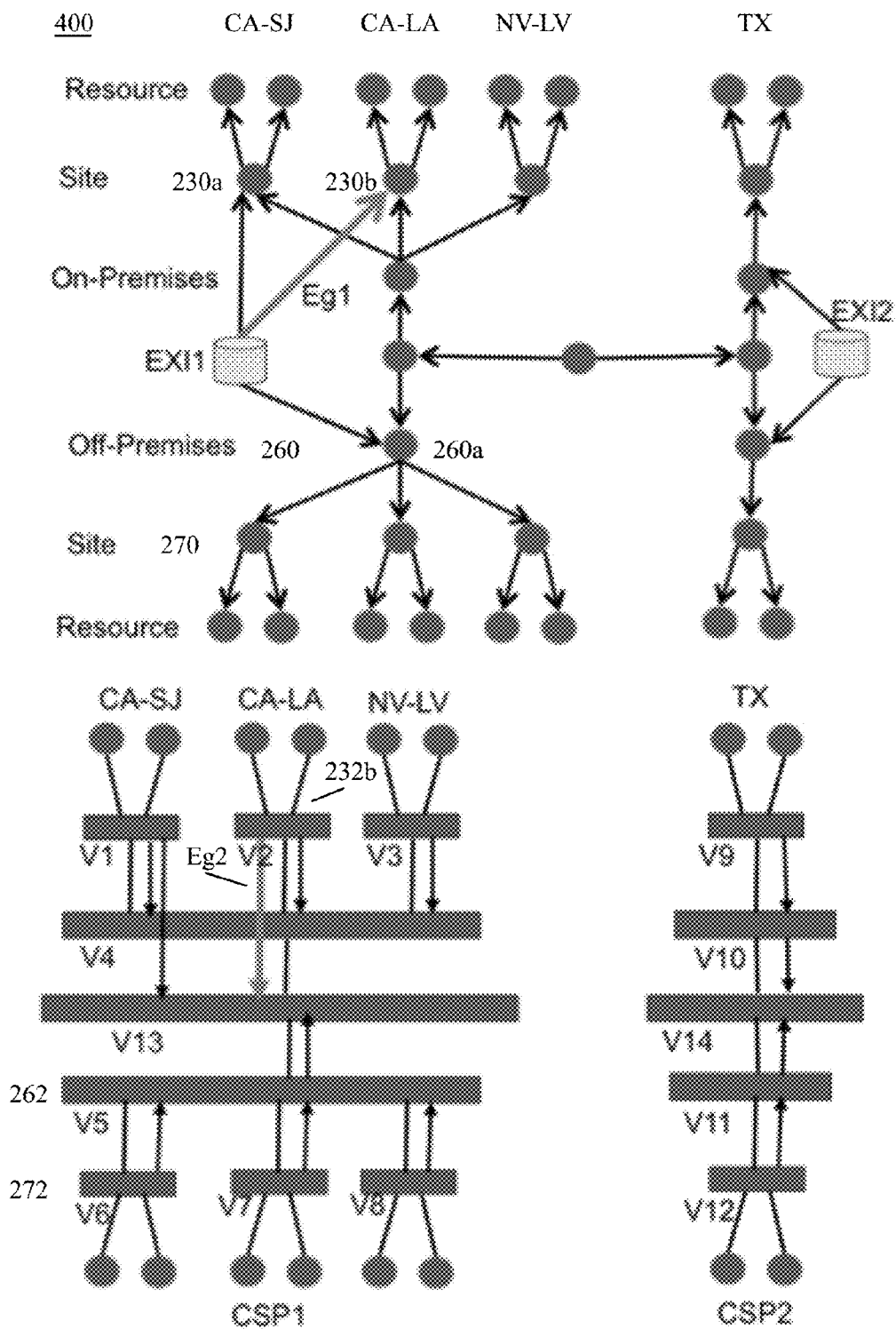
FIG. 4 illustrates elastic, on-demand, dynamic, incremental addition to the EXI and propagation across VNs, in accordance with certain example embodiments.

Referring to FIG. 4, and continuing to refer to prior figures for context, addition of an ONS or OFS to an existing extension and isolation set of resources 400 is illustrated in accordance with example embodiments. In particular, the following description, in conjunction with FIG. 4, illustrates the addition of the resources of ONS 230b to an isolation and extension domain EX1 that links ONS 230a and OFP 260a by establishing Eg1 in the MCEES and Eg2 in the E2E-VNS. When an ONS or OFS such as ONS 230b is selected for addition to an extension and isolation domain, the MCEE engines 150 create the SiteID and a set of SiteID.ResourceSetID for resource nodes that are connected to ONS 230b. If specified, the MCEE engines 150 assign the specified single domain address (SDA, such as a private IP address or prefix) to these nodes and an address translation module (such as NAT) is created and associated with this VN. The MCEE engines 150 create a new MPLS L3 VPN extended community route target (ECRT) ID (ECRTID) corresponding to the site (which can identify a specific MPLS VPN site or route prefix). The MCEE engines 150 identify the MPLS Customer Edge (CE)-Provider Edge (PE) routers connecting the site (Router IDs: CEID, PEID). The MCEE engines 150 add the new identifiers to ON-SVN V2 232b and propagate the new identifiers to ON-CVN 260 (or OF-CVN 262).

Referring to FIG. 5, and continuing to refer to prior figures for context, addition of an extension and isolation domain 500 is illustrated, in accordance with example embodiments. In particular, the MCEES and E2E-VNS of FIG. 4 is modified by introduction of EXI3 connecting the extension and isolation domains of EXIT and EXI2 in the MCEES, and by implementing changes to the E2E-VNS. After creating EXI3, the MCEE engines 150 create an EXI virtual network, in this case V15. The MCEE engines 150 create an MPLS L3 VPN routing and forwarding (VRF) table that the MCEE engines 150 attach to VN15. The MCEE engines 150 propagate (CloudID, ResourceID, ECRTID, SDA, CEID, PEID) created at the constituent VNs to VN15. If the VRF in does not exist for a constituent VN, the MCEE engines 150 program it in VN15.PEIDm. The MCEE engines 150 export the ECRTID for each node from the VRF. For all the above, reverse actions are taken when nodes or edges are deleted on-demand.

With regard to the MCEE engines 150, an MCEE engine for tenant resources can reside on the tenant premises. The tenant MCEE engine establishes and maintains the global view of the MCEE, which is illustrated in the top portion of each of FIG. 2-FIG. 5. The tenant MCEE engine also maps on-premises segments of the MCEE to on-premises segments of the E2E-VNS. An E2E-VNS is illustrated in the bottom portion of each of FIG. 2-FIG. 5. In the example figures, E2EVNS segments V4 (together with V1, V2, V3) and V10 (with V9) reside in the tenant MCEE engine. The shared VNs (V13, V14, V15) corresponding to EXIs also reside in the tenant MCEE engine. This engine, keeping the global view of the MCEE spanning multiple clouds and cloud sites, coordinates between multiple MCEE engines, such as the MCEE engine associated with the CSP1 cloud and the MCEE engine associated with the CSP2 cloud. In the examples of FIG. 2-FIG. 5, one MCEE engine is associated with the CSP1 cloud, and another MCEE engine is associated with the CSP2 cloud. The cloud-specific VNs (for example, V5, V6, V7, and V8 for CSP1) and the shared EXI VN (V13, V14, V15) also reside in each cloud VN. Expansion and contraction are performed automatically, dynamically, and elastically by the combined set of MCEE engines based on the demand for cloud services from the tenant's resources.

Referring to FIG. 6, and continuing to refer to prior figures for context, processes for multi-cloud elastic extension and isolation 600 are shown, in accordance with certain example embodiments. In such embodiments, a set of MCEE engines 150 establishes an MCEE logical structure relating at least one tenant resource of at least one tenant site, at least one resource of a first non-tenant cloud at a first non-tenant cloud site, and at least one resource of a second non-tenant cloud at a second non-tenant cloud site—Block 610.

In particular establishing an MCEE logical structure can include relating the tenant resources (for example, tenant cloud 110), the resources of a first non-tenant cloud (for example, non-tenant public cloud 120), and the resources of a second non-tenant cloud (for example, non-tenant private cloud 130), in a hierarchical tree topology by resource operator, resource operator site, and resource set at each resource operator site as shown in FIG. 2.

The structure of FIG. 2 relates a tenant's on-premises resources 240 at San Jose, Calif. (CA-SJ), Los Angeles, Calif. (CA-LA), and Las Vegas, Nev. (NV-LV) to the tenants' on-premises resources 240 in Texas, and the off-premises resources of two non-tenant cloud providers. The seamless management domain node 210, while shown as three solid circles, can be treated as a single logical node.

The set of MCEE engines 150 can map the nodes of the MCEE logical structure to a segmented end-to-end virtual network structure (E2E-VNS) such that the collection of resources at each node of the MCEE logical structure is in a separate virtual network of the E2E-VNS—Block 620. In particular, mapping the MCEE logical structure to the E2E-VNS can include mapping such that at each level of the E2E-VNS the collection of resources at each node of the MCEE logical structure is in a separate virtual network of the E2E-VNS. For example, in FIG. 3 V1-V4, V5-V8, V9-V10, and V11-V12 are all in separate E2E-VNS virtual networks.

The set of MCEE engines 150 can establish an extension and isolation (EXI) domain in the MCEE logical structure associating at least one node of the tenant resources with at least one node of the first non-tenant cloud and at least one node of the second non-tenant cloud—Block 630. FIG. 3 illustrates EXI domain EXIT associating the tenant's resources 240 at CA-SJ with resources 270 of CSP1. FIG. 3 also illustrates EXI domain EXI2 associating one set of tenant's on-premises resources 220a with the resources 270 of CSP2. Note that EXI2 could have connected tenant's TX resources at the site level with CSP2's resources at the site level to achieve the same effect. In embodiments employing a hierarchical tree structure for the MCEE structure, establishing an EXI domain can include associating at least one node of the tenant resources portion of the hierarchy with at least one node in the first non-tenant cloud portion of the hierarchy and at least one node in the second non-tenant cloud portion of the hierarchy.

The set of MCEE engines 150 can connect, for network communications, the E2E-VNS virtual networks of the nodes of the EXI domain for isolation of the resources of the nodes of the EXI domain from the other resources of the MCEE logical structure in an EXI virtual network—Block 640. In the example of FIG. 3, the MCEE engines 150 have used V13 to connect the resources of V1 (tenant's CA-SJ resources) with the resources of CSP1.

Figure 7:
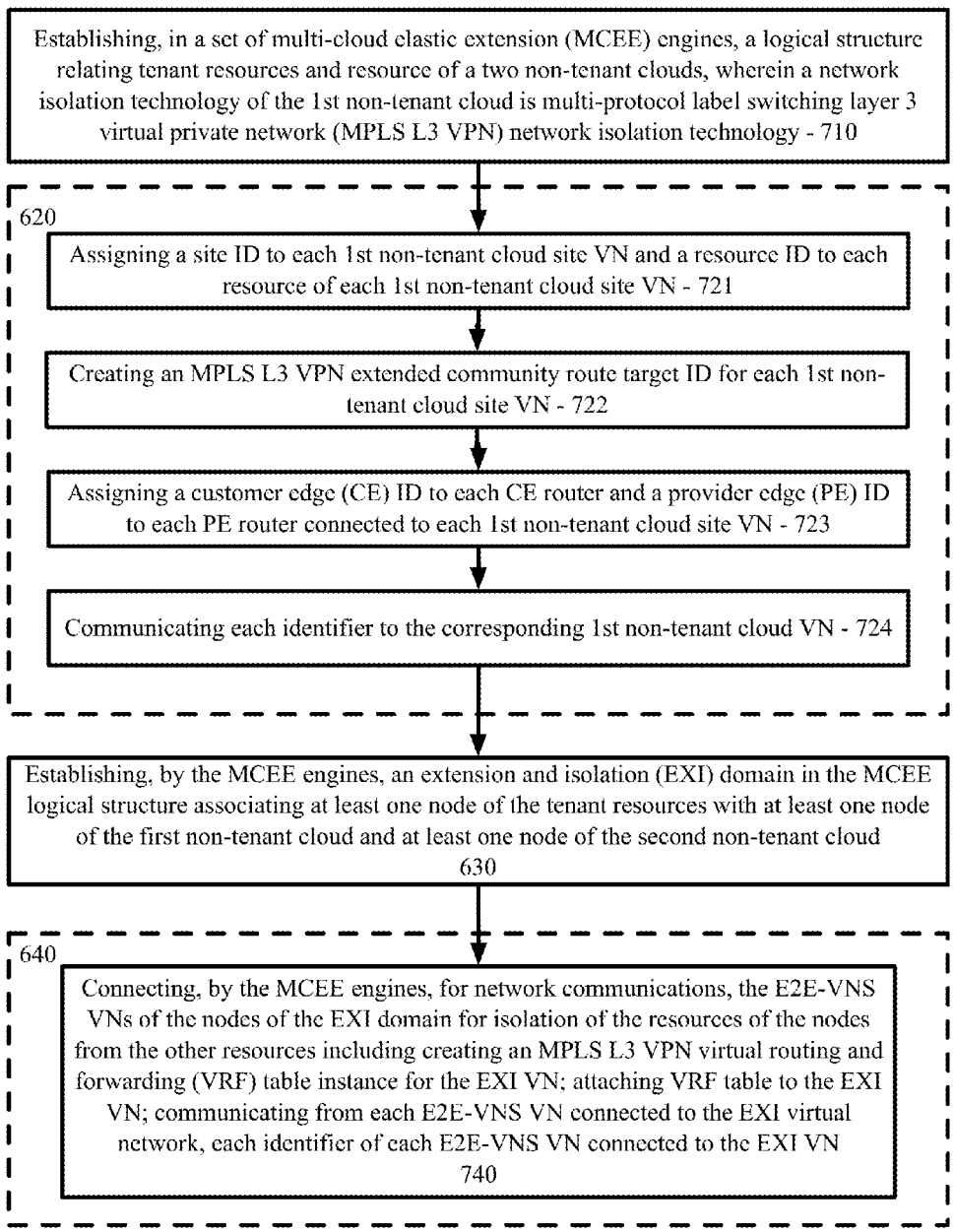
FIG. 7 is a block flow diagram depicting processes for multi-cloud elastic extension and isolation, in accordance with certain example embodiments.

Referring to FIG. 7, and continuing to refer to prior figures for context, processes for multi-cloud elastic extension and isolation 700 are shown, in accordance with certain example embodiments. In such embodiments, while Block 630 can be performed as described above, the set of MCEE engines can establish an MCEE logical structure relating tenant resources and resources of a two non-tenant clouds (as in Block 610), wherein a network isolation technology of the 1st non-tenant cloud is multi-protocol label switching layer 3 virtual private network (MPLS L3 VPN) network isolation technology—Block 710.

In such embodiments, mapping the MCEE logical structure to the E2E-VNS include several processes for each first non-tenant cloud site virtual network of the E2E-VNS. In such embodiments, the set of MCEE engines 150 can assign a site identifier to each first non-tenant cloud site virtual network and a resource identifier to each resource of each first non-tenant cloud site virtual network—Block 721.

Where the network isolation technology of the first non-tenant cloud is multiprotocol label switching layer 3 virtual private network (MPLS L3 VPN) network isolation technology, the set of MCEE engines 150 can create an MPLS L3 VPN extended community route target (ECRT) identifier for each first non-tenant cloud site virtual network—Block 722.

Cloud provider infrastructure includes both customer edge (CE) routers and provider edge (PE) routers. In the embodiments illustrated in FIG. 7, as part of mapping the MCEE logical structure to the E2E-VNS, the set of MCEE engines 150 can assign a CE identifier to each CE router connected to each first non-tenant cloud site virtual network, and a PE identifier to each PE router connected to each first non-tenant cloud site virtual network—Block 723. The set of MCEE engines 150 can then communicate each identifier to the corresponding first non-tenant cloud virtual network in the E2E-VNS—Block 724.

After establishing an EXI domain in the MCEE associating at least one node of the tenant resources with at least one node of the first non-tenant cloud and at least one node of the second non-tenant cloud (Block 630), the MCEE engines 150 can connect, for network communications, the E2E-VNS virtual networks of the nodes of the EXI domain. Such connection can comprise, creating an MPLS L3 VPN virtual routing and forwarding (VRF) table instance for the EXI virtual network, attaching the VRF table instance to the EXI virtual network, and communicating from each E2E-VNS virtual network connected to the EXI virtual network, each identifier of each E2E-VNS virtual network connected to the EXI virtual network—Block 740. In some such embodiments, mapping the MCEE logical structure to the E2E-VNS further comprises, for each first non-tenant cloud site virtual network of the E2E-VNS assigning a single domain address to each first non-tenant cloud site virtual network.

While the example of FIG. 7 involves an MPLS L3 VPN network isolation technology for the first non-tenant cloud, the set of MCEE engines 150 can implement the protocol of other network protection technologies for connecting the E2E-VNS virtual networks of the nodes of the EXI domain for isolation of the resources of the nodes from the other resources.

Figure 8:
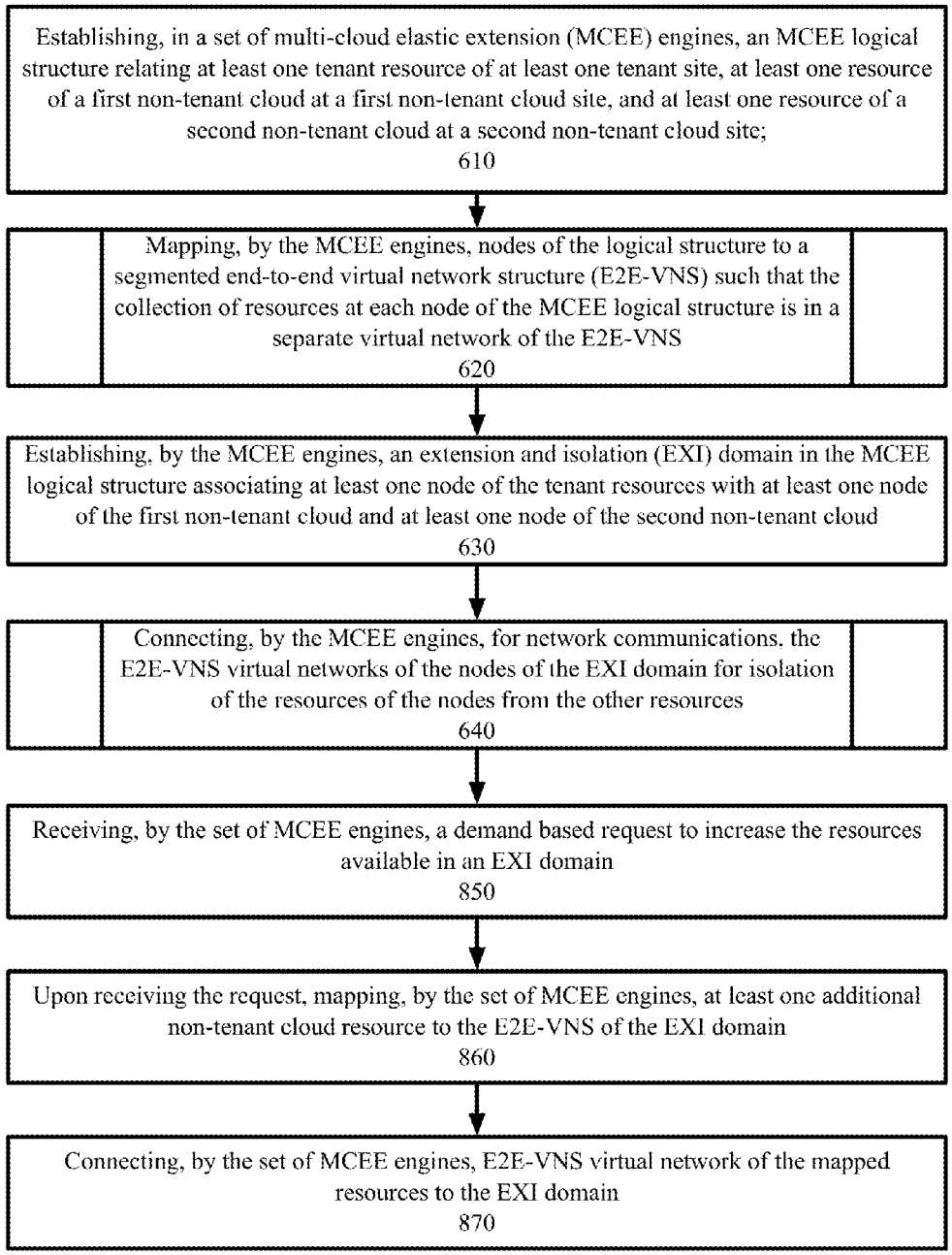
FIG. 8 is a block flow diagram depicting processes for multi-cloud elastic extension and isolation, in accordance with certain example embodiments.

Referring to FIG. 8, and continuing to refer to prior figures for context, processes for multi-cloud elastic extension and isolation 800 are shown, in accordance with certain example embodiments. In such embodiments Block 610-Block 640 can be performed as described above. In such methods, after connecting E2E-VNS virtual networks of the nodes of the EXI domain for network communications and for isolation of the resources of the nodes from the other resources, the set of MCEE engines 150 can receive a request to increase the resources available in an EXI domain—Block 850. For example, where the cloud resource is storage and the tenant through self-service provisions additional storage, the set of MCEE engines 150 can receive a request to extend the tenant's cloud 110 into the new cloud resources.

Upon receiving the request the set of MCEE engines 150 can map at least one additional non-tenant cloud resource to the E2E-VNS of the EXI domain—Block 860. Once mapped to the E2E-NVS of the EXI domain, the MCEE engines can connect the E2E-VNS virtual network of the mapped resources to the EXI domain—Block 870.

Other Example Embodiments

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area WAN, local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, freespace optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
    establishing, in a set of multi-cloud elastic extension (MCEE) engines, an MCEE logical structure relating at least one tenant resource of at least one tenant site, at least one resource of a first non-tenant cloud at a first non-tenant cloud site, and at least one resource of a second non-tenant cloud at a second non-tenant cloud site, wherein each of the tenant site, the first non-tenant cloud, and the second non-tenant cloud hosts an MCEE engine of the set of MCEE engines;
    mapping, by the set of MCEE engines, nodes of the MCEE logical structure to a segmented end-to-end virtual network structure (E2E-VNS) such that a collection of resources at each node of the MCEE logical structure is in a separate virtual network of the E2E-VNS;
    establishing, by the set of MCEE engines, an extension and isolation (EXI) domain in the MCEE logical structure associating at least one node of the tenant resources with at least one node of the first non-tenant cloud and at least one node of the second non-tenant cloud; and
    connecting, by the set of MCEE engines, for network communications, the E2E-VNS virtual networks of the nodes of the EXI domain for isolation of the resources of the nodes of the EXI domain from the other resources of the MCEE logical structure in an EXI virtual network.

2. The method of claim 1, wherein:
    establishing an MCEE logical structure comprises relating the at least one tenant resource, the at least one resource of a first non-tenant cloud, and the at least one resource of a second non-tenant cloud in a hierarchical tree topology by resource operator, resource operator site, and resource set at each resource operator site,
    mapping the MCEE logical structure to the E2E-VNS comprises mapping such that, at each level of the E2E-VNS, the collection of resources at each node of the MCEE logical structure is in separate virtual networks of the E2E-VNS, and
    establishing an EXI domain comprises establishing in the MCEE logical structure an EXI domain associating at least one node of the tenant resources portion of the hierarchy with at least one node in the first non-tenant cloud portion of the hierarchy and at least one node in the second non-tenant cloud portion of the hierarchy.

3. The method of claim 2, wherein:
    mapping the MCEE logical structure to the E2E-VNS comprises, for each first non-tenant cloud site virtual network of the E2E-VNS:
        assigning a site identifier to each first non-tenant cloud site virtual network;
        assigning a resource identifier to each resource of each first non-tenant cloud site virtual network;
        assigning a customer edge (CE) identifier to each CE router connected to each first non-tenant cloud site virtual network;
        assigning a provider edge (PE) identifier to each PE router connected to each first non-tenant cloud site virtual network; and communicating each identifier to the corresponding first non-tenant cloud virtual network in the E2E-VNS, and connecting, for network communications, the E2E-VNS virtual networks of the nodes of the EXI domain comprises communicating each identifier of each E2E-VNS virtual network connected to the EXI virtual network from each E2E-VNS virtual network connected to the EXI virtual network.

4. The method of claim 2, wherein:

a network isolation technology of the first non-tenant cloud is multiprotocol label switching layer 3 virtual private network (MPLS L3 VPN) network isolation technology, and mapping the MCEE logical structure to the E2E-VNS comprises, for each first non-tenant cloud site virtual network of the E2E-VNS:

assigning a site identifier to each first non-tenant cloud site virtual network;

assigning a resource identifier to each resource of each first non-tenant cloud site virtual network;

creating an MPLS L3 VPN extended community route target (ECRT) identifier for each first non-tenant cloud site virtual network;

assigning a customer edge (CE) identifier to each CE router connected to each first non-tenant cloud site virtual network;

assigning a provider edge (PE) identifier to each PE router connected to each first non-tenant cloud site virtual network; and communicating each identifier to the corresponding first non-tenant cloud virtual network in the E2E-VNS, and connecting, for network communications, the E2E-VNS virtual networks of the nodes of the EXI domain comprises creating an MPLS L3 VPN virtual routing and forwarding (VRF) table instance for the EXI virtual network; attaching the VRF table instance to the EXI virtual network; and communicating, from each E2E-VNS virtual network connected to the EXI virtual network, each identifier of each E2E-VNS virtual network connected to the EXI virtual network.

5. The method of claim 4, wherein mapping the MCEE logical structure to the E2E-VNS further comprises, for each first non-tenant cloud site virtual network of the E2E-VNS, assigning a single domain address to each first non-tenant cloud site virtual network.

6. The method of claim 1, wherein:

the at least one tenant resource comprises a tenant cloud operating under a first network isolation technology, and the first non-tenant cloud comprises a cloud operating under a second network isolation technology different than the first network isolation technology.

7. The method of claim 1, further comprising:

receiving, by the set of MCEE engines, a demand based request to increase the resources available in an EXI domain;

upon receiving the request, mapping, by the set of MCEE engines, at least one additional non-tenant cloud resource to the E2E-VNS of the EXI domain; and connecting, by the set of MCEE engines, the E2E-VNS virtual network of the mapped resources to the EXI domain.

8. One or more computer readable non-transitory storage media encoded with software comprising computer executable instructions that when executed are operable to:

establish a multi-cloud elastic extension (MCEE) logical structure relating at least one tenant resource of at least one tenant site, at least one resource of a first non-tenant cloud at a first non-tenant cloud site, and at least one resource of a second non-tenant cloud at a second non-tenant cloud site, wherein each of the tenant site, the first non-tenant cloud, and the second non-tenant cloud hosts an MCCE engine of the set of MCEE engines;

map nodes of the MCEE logical structure to a segmented end-to-end virtual network structure (E2E-VNS) such that the collection of resources at each node of the MCEE logical structure is in a separate virtual network of the E2E-VNS;

establish an extension and isolation (EXI) domain in the MCEE logical structure associating at least one node of the tenant resources with a at least one node of the first non-tenant cloud and at least one node of the second non-tenant cloud; and connect, for network communications, the E2E-VNS virtual networks of the nodes of the EXI domain for isolation of the resources of the nodes of the EXI domain from the other resources of the MCEE logical structure in an EXI virtual network.

9. The computer readable storage media of claim 8, wherein:

establishing an MCEE logical structure comprises, relating the at least one tenant resource, the at least one resource of a first non-tenant cloud, and the at least one resource of a second non-tenant cloud, in a hierarchical tree topology by resource operator, resource operator site, and resource set at each resource operator site;

mapping the MCEE logical structure to the E2E-VNS comprises, mapping such that at each level of the E2E-VNS the collection of resources at each node of the MCEE logical structure are in separate virtual networks of the E2E-VNS; and establishing an EXI domain comprises, establishing in the MCEE logical structure an EXI domain associating at least one node of the tenant resources portion of the hierarchy with at least one node in the first non-tenant cloud portion of the hierarchy and at least one node in the second non-tenant cloud portion of the hierarchy.

10. The computer readable storage media of claim 9, wherein:

mapping the MCEE logical structure to the E2E-VNS comprises, for each first non-tenant cloud site virtual network of the E2E-VNS:

assigning a site identifier to each first non-tenant cloud site virtual network, assigning a resource identifier to each resource of each first non-tenant cloud site virtual network;

assigning a customer edge (CE) identifier to each CE router connected to each first non-tenant cloud site virtual network, assigning a provider edge (PE) identifier to each PE router connected to each first non-tenant cloud site virtual network, and communicating each identifier to the corresponding first non-tenant cloud virtual network in the E2E-VNS; and connecting, for network communications, the E2E-VNS virtual networks of the nodes of the EXI domain comprises, communicating each identifier of each E2E-VNS virtual network connected to the EXI virtual network from each E2E-VNS virtual network connected to the EXI virtual network.

11. The computer readable storage media of claim 9, wherein:
- a network isolation technology of the first non-tenant cloud is multiprotocol label switching layer 3 virtual private network (MPLS L3 VPN) network isolation technology;
- mapping the MCEE logical structure to the E2E-VNS comprises, for each first non-tenant cloud site virtual network of the E2E-VNS:
  - assigning a site identifier to each first non-tenant cloud site virtual network,
  - assigning a resource identifier to each resource of each first non-tenant cloud site virtual network,
  - creating an MPLS L3 VPN extended community route target (ECRT) identifier for each first non-tenant cloud site virtual network;
  - assigning a customer edge (CE) identifier to each CE router connected to each first non-tenant cloud site virtual network,
  - assigning a provider edge (PE) identifier to each PE router connected to each first non-tenant cloud site virtual network, and
  - communicating each identifier to the corresponding first non-tenant cloud virtual network in the E2E-VNS; and
- connecting, for network communications, the E2E-VNS virtual networks of the nodes of the EXI domain comprises, creating an MPLS L3 VPN virtual routing and forwarding (VRF) table instance for the EXI virtual network; attaching the VRF table instance to the EXI virtual network; and communicating from each E2E-VNS virtual network connected to the EXI virtual network, each identifier of each E2E-VNS virtual network connected to the EXI virtual network.

12. The computer readable storage media of claim 11, wherein mapping the MCEE logical structure to the E2E-VNS further comprises, for each first non-tenant cloud site virtual network of the E2E-VNS assigning a single domain address to each first non-tenant cloud site virtual network.

13. The computer readable storage media of claim 8, wherein:
- the at least one tenant resource comprises a tenant cloud operating under a first network isolation technology, and the first non-tenant cloud comprises a cloud operating under a second network isolation technology different than the first network isolation technology.

14. The computer readable storage media of claim 8, further comprising:
- receiving, by the set of MCEE engines, a demand based request to increase the resources available in an EXI domain;
- upon receiving the request, mapping, by the set of MCEE engines, at least one additional non-tenant cloud resource to the E2E-VNS of the EXI domain; and
- connecting, by the set of MCEE engines, E2E-VNS virtual network of the mapped resources to the EXI domain.

15. A system, comprising:
- one or more computer readable storage media; and
- at least one processor communicatively coupled to the storage device, wherein the at least one processor executes application code instructions that are stored in the one or more computer readable storage media to cause the system to:
  - establish a multi-cloud elastic extension (MCEE) logical structure relating at least one tenant resource of at least one tenant site, at least one resource of a first non-tenant cloud at a first non-tenant cloud site, and at least one resource of a second non-tenant cloud at a second non-tenant cloud site, wherein each of the tenant site, the first non-tenant cloud, and the second non-tenant cloud hosts at least one of the at least one processors and at least one of the one or more computer readable storage media;
  - map nodes of the MCEE logical structure to a segmented end-to-end virtual network structure (E2E-VNS) such that the collection of resources at each node of the MCEE logical structure is in a separate virtual network of the E2E-VNS;
  - establish an extension and isolation (EXI) domain in the MCEE logical structure associating at least one node of the tenant resources with a at least one node of the first non-tenant cloud and at least one node of the second non-tenant cloud; and
  - connect, for network communications, the E2E-VNS virtual networks of the nodes of the EXI domain for isolation of the resources of the nodes of the EXI domain from the other resources of the MCEE logical structure in an EXI virtual network.

16. The system of claim 15, wherein:
- establishing an MCEE logical structure comprises, relating the at least one tenant resource, the at least one resource of a first non-tenant cloud, and the at least one resource of a second non-tenant cloud, in a hierarchical tree topology by resource operator, resource operator site, and resource set at each resource operator site;
- mapping the MCEE logical structure to the E2E-VNS comprises, mapping such that at each level of the E2E-VNS the collection of resources at each node of the MCEE logical structure are in separate virtual networks of the E2E-VNS; and
- establishing an EXI domain comprises, establishing in the MCEE logical structure an EXI domain associating at least one node of the tenant resources portion of the hierarchy with at least one node in the first non-tenant cloud portion of the hierarchy and at least one node in the second non-tenant cloud portion of the hierarchy.

17. The system of claim 16, wherein:
- mapping the MCEE logical structure to the E2E-VNS comprises, for each first non-tenant cloud site virtual network of the E2E-VNS:
  - assigning a site identifier to each first non-tenant cloud site virtual network,
  - assigning a resource identifier to each resource of each first non-tenant cloud site virtual network;
  - assigning a customer edge (CE) identifier to each CE router connected to each first non-tenant cloud site virtual network,
  - assigning a provider edge (PE) identifier to each PE router connected to each first non-tenant cloud site virtual network, and
  - communicating each identifier to the corresponding first non-tenant cloud virtual network in the E2E-VNS; and
- connecting, for network communications, the E2E-VNS virtual networks of the nodes of the EXI domain comprises, communicating each identifier of each E2E-VNS virtual network connected to the EXI virtual network from each E2E-VNS virtual network connected to the EXI virtual network.

18. The system of claim 16, wherein:

a network isolation technology of the first non-tenant cloud is multiprotocol label switching layer 3 virtual private network (MPLS L3 VPN) network isolation technology;

mapping the MCEE logical structure to the E2E-VNS comprises, for each first non-tenant cloud site virtual network of the E2E-VNS:

- assigning a site identifier to each first non-tenant cloud site virtual network,
- assigning a resource identifier to each resource of each first non-tenant cloud site virtual network,
- creating an MPLS L3 VPN extended community route target (ECRT) identifier for each first non-tenant cloud site virtual network;
- assigning a customer edge (CE) identifier to each CE router connected to each first non-tenant cloud site virtual network,
- assigning a provider edge (PE) identifier to each PE router connected to each first non-tenant cloud site virtual network, and
- communicating each identifier to the corresponding first non-tenant cloud virtual network in the E2E-VNS; and
- connecting, for network communications, the E2E-VNS virtual networks of the nodes of the EXI domain comprises, creating an MPLS L3 VPN virtual routing and forwarding (VRF) table instance for the EXI virtual network; attaching the VRF table instance to the EXI virtual network; and communicating from each E2E-VNS virtual network connected to the EXI virtual network, each identifier of each E2E-VNS virtual network connected to the EXI virtual network.

19. The system of claim 18, wherein mapping the MCEE logical structure to the E2E-VNS further comprises, for each first non-tenant cloud site virtual network of the E2E-VNS, assigning a single domain address to each first non-tenant cloud site virtual network.

20. The system of claim 15, wherein:

the at least one tenant resource comprises a tenant cloud operating under a first network isolation technology, and the first non-tenant cloud comprises a cloud operating under a second network isolation technology different than the first network isolation technology.

* * * * *